United States Patent
Moro et al.

(10) Patent No.: US 11,203,990 B2
(45) Date of Patent: Dec. 21, 2021

(54) AUTOMATIC STOP/RESTART SYSTEM FOR INTERNAL COMBUSTION ENGINE

(71) Applicant: HONDA MOTOR CO., LTD., Tokyo (JP)

(72) Inventors: Kosuke Moro, Wako (JP); Ryuji Sato, Wako (JP); Hiroaki Ninomiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/202,580

(22) Filed: Mar. 16, 2021

(65) Prior Publication Data

US 2021/0293188 A1    Sep. 23, 2021

(30) Foreign Application Priority Data

Mar. 19, 2020   (JP) .............................. JP2020-049084

(51) Int. Cl.
| | |
|---|---|
| F02N 11/08 | (2006.01) |
| F02D 29/02 | (2006.01) |
| B60K 6/543 | (2007.10) |

(52) U.S. Cl.
CPC .............. *F02D 29/02* (2013.01); *B60K 6/543* (2013.01); *B60W 2520/16* (2013.01); *B60W 2540/12* (2013.01); *F02N 11/0818* (2013.01); *F02N 2200/0802* (2013.01); *F02N 2200/102* (2013.01)

(58) Field of Classification Search
CPC .... F02D 29/02; B60K 6/543; B60W 2540/12; B60W 2520/16; F02N 2200/0802; F02N 2200/102; F02N 11/0818
See application file for complete search history.

(56) References Cited

U.S. PATENT DOCUMENTS

2015/0105949 A1*   4/2015   Wright ............ B60W 30/18009
                                                         701/22
2015/0159613 A1*   6/2015   Jensen ................... B60W 10/06
                                                         701/68

FOREIGN PATENT DOCUMENTS

| CN | 103026035 B | * | 8/2015 | ............. F02D 17/00 |
| EP | 1227230 A2 | * | 7/2002 | ............. B60W 10/18 |
| JP | 2014-227912 A | | 12/2014 | |
| JP | 2015214932 A | * | 12/2015 | .......... F02N 11/0837 |

* cited by examiner

*Primary Examiner* — Justin Holmes
(74) *Attorney, Agent, or Firm* — Westerman, Hattori, Daniels & Adrian, LLP

(57) ABSTRACT

A vehicle equipped with an automatic stop/restart system for an internal combustion engine includes a hydraulic continuously variable transmission and a parking mechanism. The continuously variable transmission changes power of the internal combustion engine using hydraulic pressure boosted by rotational driving force of the internal combustion engine. The parking mechanism holds the vehicle stationary by locking, with a locking member, the rotation of a power transmitting member between the internal combustion engine and driving wheels when a shift position is in a parking range. In an automatic stop state of the internal combustion engine, when the shift position is in the parking range and brakes are turned off, an electronic control unit executes restart if an inclination angle of the vehicle is greater than or equal to a predetermined value, and maintains the automatic stop state if the inclination angle is smaller than the predetermined value.

5 Claims, 5 Drawing Sheets

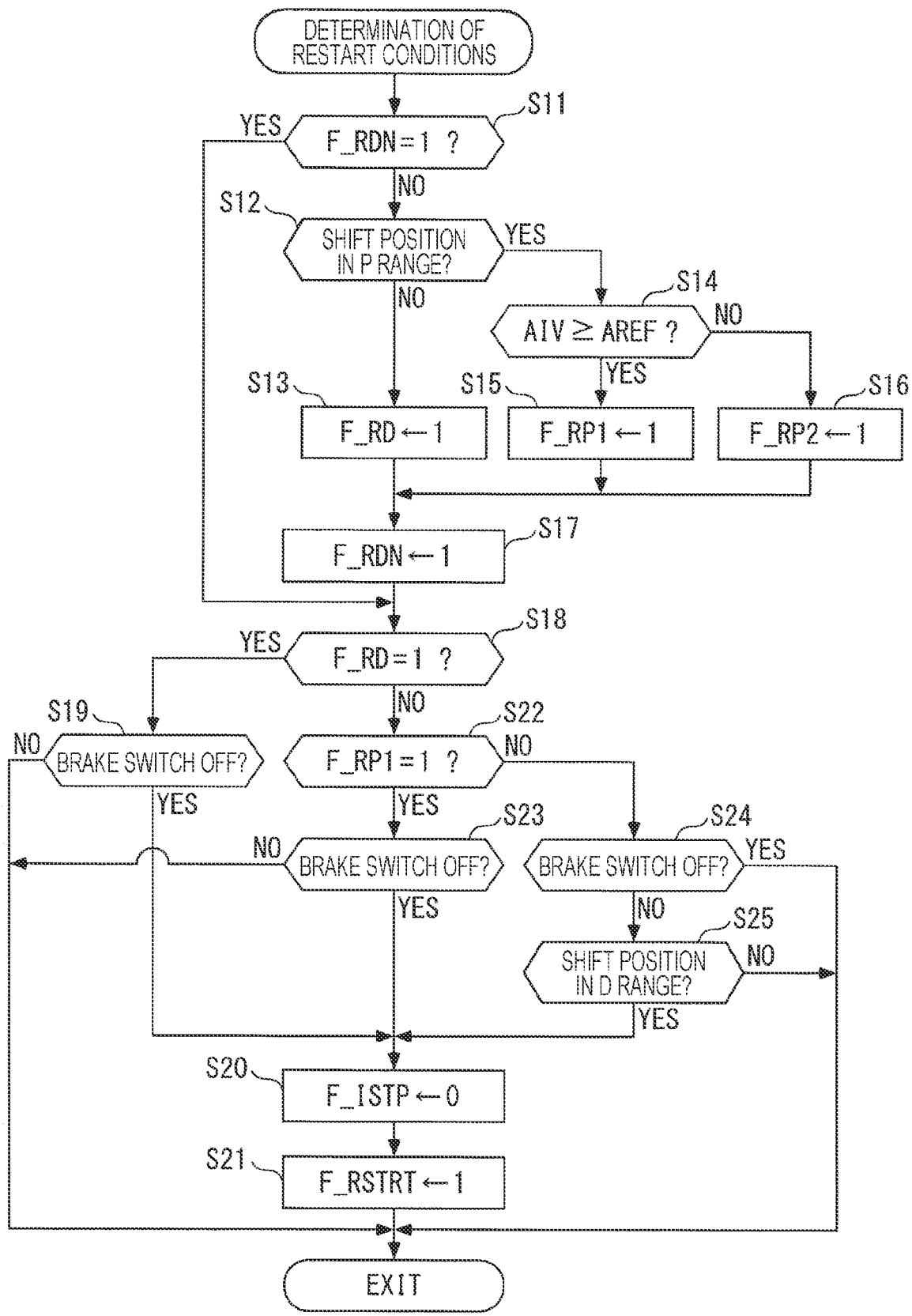

AUTOMATIC STOP/RESTART SYSTEM FOR INTERNAL COMBUSTION ENGINE

CROSS REFERENCES TO RELATED APPLICATIONS

The present application claims priority under 35 U.S.C. § 119 to Japanese Patent Application No. 2020-049084, filed Mar. 19, 2020, entitled "Automatic Stop/Restart System for Internal Combustion Engine." The contents of this application are incorporated herein by reference in their entirety.

TECHNICAL FIELD

The present disclosure relates to an automatic stop/restart system for an internal combustion engine mounted in a vehicle. The automatic stop/restart system automatically stops the internal combustion engine when predetermined stop conditions are met, and then automatically restarts the internal combustion engine when predetermined restart conditions are met.

BACKGROUND

As an automatic stop/restart system of this type, for example, the one described in Japanese Unexamined Patent Application Publication No. 2014-227912 has been known. With this automatic stop/restart system (hereinafter simply referred to as "system"), the internal combustion engine is automatically stopped when predetermined stop conditions (e.g., the vehicle stops, with the brakes applied) are met, and automatically restarted when, in this "automatic stop" state or mode, predetermined restart conditions (e.g., the shift position of the shift lever is outside the neutral (N) range, the brakes are not applied, and the gas pedal is pressed) are met.

Even when the restart conditions described above are met, if the shift lever is temporarily placed in the reverse (R) or parking (P) range and the brakes are applied, this system of the related art prohibits the restart on the assumption that the driver has no intention of restarting. This prevents the restart from accidentally happening when the shift lever momentarily passes through the R range. Even in this case, if the inclination angle of the vehicle in the forward and backward direction is greater than a predetermined value, the restart is executed to prevent the vehicle from rolling backward on a slope.

SUMMARY

However, the following problems occur if this system of the related art is used for a vehicle with a transmission (e.g., hydraulic belt-type continuously variable transmission) that uses hydraulic pressure boosted by an internal combustion engine, and also with a parking mechanism that holds the vehicle stationary when the shift position is in the P range.

For example, assume that the internal combustion engine is automatically stopped with the brakes applied, and the vehicle is stationary on a slope. When the shift lever is placed in the P range in this case, a parking pole of the parking mechanism engages with a parking gear. When the application of the brakes is released in this state, wheels and the parking gear integral therewith rotate in accordance with the inclination of the slope. This pushes the notched face of the parking gear against the tooth face of the parking pole, causes the weight of the vehicle to act as a load on the parking pole, and causes the axle to twist.

Then, when the shift lever is moved from the current P range to, for example, the drive (D) range to start the vehicle, the parking pole is disengaged from the parking gear. The load described above is thus abruptly released and quickly transmitted through the parking gear to pulleys of the continuously variable transmission. However, when the continuously variable transmission is of a hydraulic belt type, where hydraulic pressure boosted by the rotational driving force generated in the internal combustion engine is used as lateral pressure on the pulleys for setting and maintaining the transmission gear ratio, the lateral pressure on the pulley tends to drop in idle reduction mode.

Accordingly, if the load released by the disengagement from the parking gear abruptly acts on the pulleys in idle reduction mode, a lack of corresponding lateral pressure on the pulleys may cause the pulleys to move in the axial direction, and may cause the belt wound around the pulleys to slip off. This may damage the belt and shorten its life. As a solution to such problems, the system of the related art simply determines, when restart conditions are met, the shift position being in the P range and the inclination angle of the vehicle. This merely prevents accidental restarting or prevents the vehicle from rolling backward on the slope, and thus cannot eliminate the problems described above. For improved hydraulic responsiveness at the start of driving, a motor-driven oil pump is driven in idle reduction mode to cause oil to fill an oil passage. To provide high hydraulic pressure, however, the oil pump needs to have a large capacity. This increases costs and leads to lower fuel economy.

The present application describes, for example, an automatic stop/restart system for an internal combustion engine that solves the problems described above. When the vehicle is one that includes a hydraulic transmission and a parking mechanism, the automatic stop/restart system prevents problems associated with an operation involving shifting of a shift operation member from a parking range in an automatic stop state of the internal combustion engine on a slope, and extends the automatic stop period as much as possible.

A first aspect of the present disclosure is an automatic stop/restart system for an internal combustion engine. The automatic stop/restart system automatically stops an internal combustion engine 3 mounted in a vehicle V when predetermined stop conditions are met and automatically restarts the internal combustion engine 3 when predetermined restart conditions are met. The vehicle V includes a hydraulic transmission (continuously variable transmission 10 in embodiments; the same applies hereinafter in this chapter) and a parking mechanism 20. The hydraulic transmission changes power of the internal combustion engine 3 using hydraulic pressure boosted by rotational driving force of the internal combustion engine 3. The parking mechanism 20 includes a locking member (parking pole 22) and holds the vehicle V stationary by locking, with the locking member, the rotation of a power transmitting member (countershaft 13) when a shift position SP of a shift operation member (shift lever) of the transmission is in a parking (P) range. The power transmitting member transmits power between the internal combustion engine 3 and driving wheels (front wheels W). The automatic stop/restart system includes a shift position detector (shift position sensor 33) configured to detect the shift position SP; an inclination angle detector (inclination angle sensor 34) configured to detect, in a forward and backward direction, an inclination angle AIV of the vehicle V being stationary; a brake operating state detector (brake switch 37) configured to detect an operating state of brakes (brake pedal) of the vehicle V; and a restart controller (ECU 2, see FIG. 6) configured to perform control in such a manner that when, in an automatic stop state of the internal combustion engine 3, the detected shift position SP of the shift operation member is in the parking range and the brakes are turned off, the internal combustion engine 3 is restarted if the detected inclination angle AIV is greater than or equal to a predetermined value AREF and the automatic stop state of the internal combustion engine 3 is maintained if the detected inclination angle AIV is smaller than the predetermined value AREF.

This configuration enables so-called idle reduction control, by which the internal combustion engine mounted in the vehicle is automatically stopped when predetermined stop conditions are met and automatically restarted when predetermined restart conditions are met later on. The vehicle includes a hydraulic transmission and a parking mechanism. The hydraulic transmission uses hydraulic pressure boosted by rotational driving force generated by the internal combustion engine. When the shift position of the shift operation member is in the parking range, the parking mechanism holds the vehicle stationary by locking, with the locking member, the rotation of the power transmitting member between the internal combustion engine and driving wheels.

With this configuration, for example, when predetermined stop conditions are met on a slope, if the internal combustion engine is automatically stopped, with the brakes applied, to bring the vehicle to a standstill on the slope and the shift operation member is placed in the parking range, then the parking mechanism locks the rotation of the power transmitting member to hold the vehicle stationary. If the application of the brakes is released in this state, the driving wheels rotate in accordance with the inclination of the slope. This pushes the power transmitting member against the locking member of the parking mechanism, causes the weight of the vehicle to act as a load on the locking member, and causes the axle to twist. At the same time, hydraulic pressure in the transmission tends to drop in the automatic stop state, because it is boosted by rotational driving force generated in the internal combustion engine.

The present disclosure takes such circumstances into account. That is, when, in the automatic stop state, the detected shift position of the shift operation member is in the parking range and the detected inclination angle of the vehicle is greater than or equal to the predetermined value, the internal combustion engine is restarted if the brakes are turned off. The hydraulic pressure in the transmission that has been dropped in the automatic stop state is thus boosted and restored, and this ensures sufficient supply of hydraulic pressure in advance. Therefore, when the shift operation member is moved from the parking range to, for example, a drive (D) range to start the vehicle later on, even if the resulting disengagement of the locking member of the parking mechanism from the power transmitting member causes the load described above to be abruptly released and transmitted through the power transmitting member to the transmission, it is possible to avoid problems, such as negative impacts on the transmission.

On the other hand, when, in the automatic stop state, the shift position of the shift operation member is in the parking range and the inclination angle of the vehicle is smaller than the predetermined value, the restart of the internal combustion engine is put on hold even if the brakes are turned off. Thus, when the inclination angle of the vehicle is relatively small and the problems described above are less likely to occur, the restart of the internal combustion engine is put on hold and the automatic stop state is maintained. Thus, as many advantages as possible of idle reduction, including improved fuel economy, are achievable.

According to a second aspect of the present disclosure, in the automatic stop/restart system described in the first aspect, the transmission may be a hydraulic belt-type continuously variable transmission 10 that includes a drive pulley 12 and a driven pulley 14 mounted on an input shaft (main shaft 11) and an output shaft (countershaft 13), respectively, and configured to steplessly set a transmission gear ratio in accordance with a groove width varied by the hydraulic pressure; and an endless belt (transmitting belt 15) wound around the drive pulley 12 and the driven pulley 14.

With this configuration, when, in the situation described above, the inclination angle of the vehicle is greater than or equal to the predetermined value, the internal combustion engine is restarted if the brakes are turned off. This ensures supply of hydraulic pressure that is sufficient to maintain the groove width of the drive pulley and the driven pulley. Therefore, when the shift operation member is moved from the parking range later on, even if the resulting disengagement of the locking member from the power transmitting member causes abrupt transmission of significant load to the transmission, the groove width of the drive pulley and the driven pulley is maintained. This prevents the belt from slipping off the pulleys, prevents the resulting damage to the pulleys and the belt, and extends their lives.

According to a third aspect of the present disclosure, in the automatic stop/restart system described in the first aspect, the brake operating state detector may determine, when a braking force of the vehicle V exerted by the brakes is less than or equal to a predetermined value, that the brakes are off, and the predetermined value may be set to a larger value for a larger inclination angle AIV.

With this configuration, when the inclination angle is large, the braking force is less likely to exceed the predetermined value. This makes it possible to determine at an earlier stage that the brakes have been turned off, advance the start of restart operation, and ensure sufficient supply of hydraulic pressure. Even when the predetermined value is set to a larger value in accordance with the inclination angle, if the brakes are applied hard with a braking force exceeding the predetermined value, the automatic stop state is maintained with no load applied to the parking mechanism. In the above explanation of the exemplary embodiment, specific elements with their reference numerals are indicated. These specific elements are presented as mere examples in order to facilitate understanding, and thus, should not be interpreted as any limitation to the accompanying claims.

BRIEF DESCRIPTION OF THE DRAWINGS

The advantages of the disclosure will become apparent in the following description taken in conjunction with the following drawings.

FIG. 6 is a flowchart illustrating determination of restart conditions in the process illustrated in FIG. 5.

DESCRIPTION OF THE PREFERRED EMBODIMENTS

Figure 1:
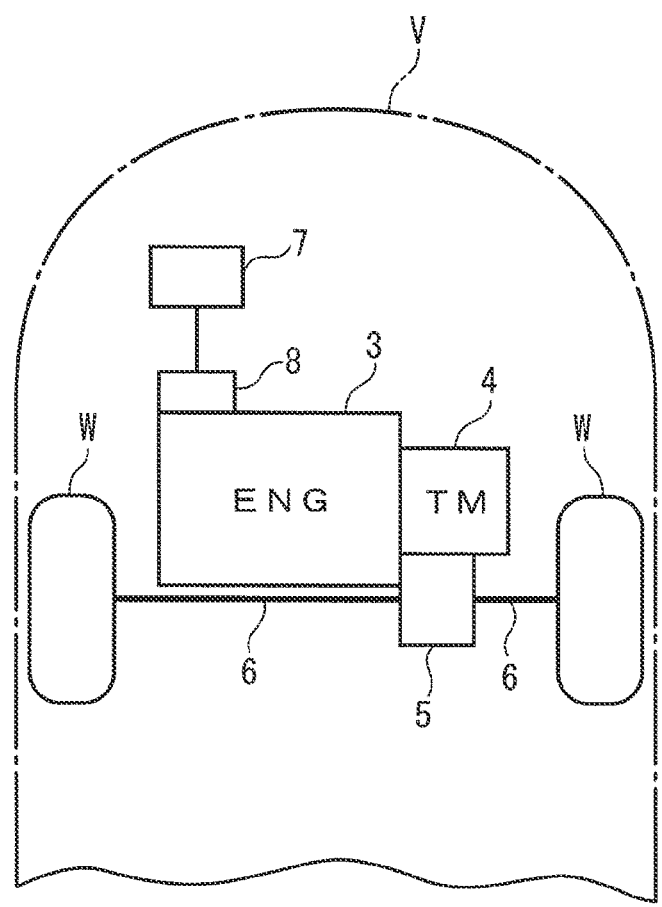
FIG. 1 is a diagram schematically illustrating part of a vehicle to which an automatic stop/restart system for an internal combustion engine according to an embodiment is applied.

Preferred embodiments of the present disclosure will now be described with reference to the drawings. FIG. 1 schematically illustrates part of a vehicle V to which an automatic stop/restart system 1 for an internal combustion engine, according to an embodiment of the present disclosure, is applied. As illustrated in FIG. 1, the vehicle V is a front-wheel-drive four-wheel vehicle that has right and left front wheels W and right and left rear wheels (not shown). An internal combustion engine (hereinafter referred to as "engine" (ENG)) 3 and an automatic transmission (TM) 4 that changes power of the engine 3 are mounted at the front of the vehicle V.

The automatic transmission 4 includes a shift lever (not shown) capable of selecting one of a plurality of shift positions, including "drive (D) range", "neutral (N) range", "reverse (R) range", and "parking (P) range", and a continuously variable transmission 10 (see FIG. 2) configured to steplessly change the power of the engine 3. The power of the engine 3 is changed by the automatic transmission 4, transmitted through a final reduction gear 5 and right and left drive shafts 6 to the right and left front wheels W, and thereby enables the vehicle V to run.

Figure 2:
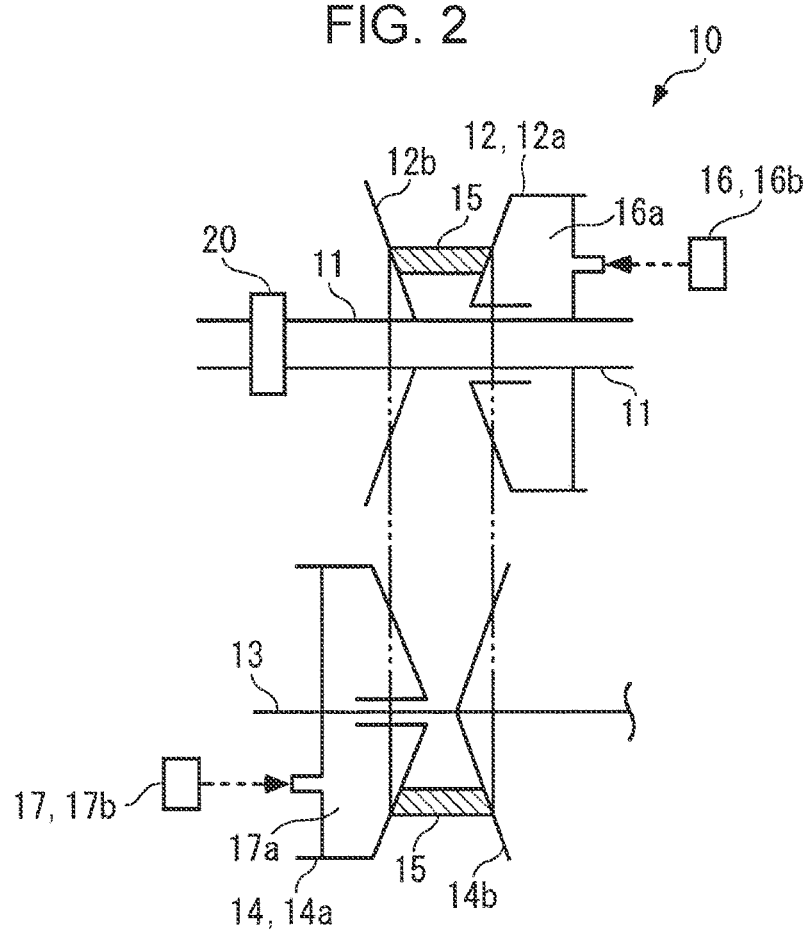
FIG. 2 is a diagram schematically illustrating a continuously variable transmission.

As illustrated in FIG. 2, the continuously variable transmission 10 is a belt-type transmission and includes a main shaft 11 coupled to a crankshaft (not shown) of the engine 3, with a clutch (not shown) interposed therebetween, a drive pulley 12 attached to the main shaft 11, a countershaft 13 disposed parallel to the main shaft 11 and coupled to the final reduction gear 5, a driven pulley 14 attached to the countershaft 13, a transmitting belt 15 stretched between and wound around the pulleys 12 and 14, and a drive-pulley-width varying mechanism 16 and a driven-pulley-width varying mechanism 17 configured to vary the pulley widths of the drive pulley 12 and the driven pulley 14, respectively.

The drive pulley 12 has a movable portion 12a and a fixed portion 12b that are circular truncated cone shaped and opposite each other. The movable portion 12a is attached to the main shaft 11 in an axially movable, relatively non-rotatable manner, whereas the fixed portion 12b is secured to the main shaft 11. The opposite surfaces of the movable portion 12a and the fixed portion 12b are inclined surfaces that define a V-shaped belt groove around which the transmitting belt 15 is wound.

The drive-pulley-width varying mechanism 16 includes a drive-side (DR) oil chamber 16a in the movable portion 12a of the drive pulley 12, and a DR solenoid valve 16b for regulating the hydraulic pressure supplied to the DR oil chamber 16a. The DR solenoid valve 16b is connected through an oil passage 18a to an oil pump 18b (see FIG. 4).

The oil pump 18b is coupled to the main shaft 11 of the continuously variable transmission 10 to which rotational driving force is transmitted from the crankshaft of the engine 3. During operation of the engine 3, the oil pump 18b is driven by the crankshaft. By rotating the main shaft 11, the oil pump 18b boosts the pressure of working fluid, discharges the working fluid, and supplies the hydraulic pressure through the oil passage 18a to the DR solenoid valve 16b. The valve opening of the DR solenoid valve 16b is controlled by an electronic control unit (ECU) 2 (described below). This regulates, to a drive-side working hydraulic pressure DROIL, the hydraulic pressure supplied to the DR oil chamber 16a.

With the configuration described above, during operation of the engine 3, the DR solenoid valve 16b of the drive-pulley-width varying mechanism 16 is controlled by the ECU 2, so that the movable portion 12a is driven in the axial direction. This controls the force with which the movable portion 12a presses the transmitting belt 15 against the fixed portion 12b. An effective diameter PDRD of the drive pulley 12 is thus steplessly changed between a small diameter for low-speed transmission gear ratio and a large diameter for high-speed transmission gear ratio.

The driven pulley 14 is configured similarly to the drive pulley 12. That is, the driven pulley 14 has a movable portion 14a and a fixed portion 14b that are circular truncated cone shaped and opposite each other. The movable portion 14a is attached to the countershaft 13 in an axially movable, non-rotatable manner, whereas the fixed portion 14b is secured to the countershaft 13. The opposite surfaces of the movable portion 14a and the fixed portion 14b are also inclined surfaces that define a V-shaped belt groove around which the transmitting belt 15 is wound. The transmitting belt 15 is made of metal and wound around the pulleys 12 and 14 while being fitted in the belt grooves of the pulleys 12 and 14.

The driven-pulley-width varying mechanism 17 is also configured similarly to the drive-pulley-width varying mechanism 16. That is, the driven-pulley-width varying mechanism 17 includes a driven-side (DN) oil chamber 17a in the movable portion 14a of the driven pulley 14, and a DN solenoid valve 17b for regulating the hydraulic pressure supplied to the DN oil chamber 17a. The DN solenoid valve 17b is connected through the oil passage 18a to the oil pump 18b (see FIG. 4).

The oil pump 18b supplies hydraulic pressure through the oil passage 18a to the DN solenoid valve 17b. The valve opening of the DN solenoid valve 17b is controlled by the ECU 2. This regulates, to a driven-side working hydraulic pressure DNOIL, the hydraulic pressure supplied to the DN oil chamber 17a.

With the configuration described above, during operation of the engine 3, the DN solenoid valve 17b of the driven-pulley-width varying mechanism 17 is controlled by the ECU 2, so that the movable portion 14a is driven in the axial direction. This controls the force with which the movable portion 14a presses the transmitting belt 15 against the fixed portion 14b. An effective diameter PDND of the driven pulley 14 is thus steplessly changed between a small diameter for low-speed transmission gear ratio and a large diameter for high-speed transmission gear ratio.

As described above, in the continuously variable transmission 10, the two solenoid valves 16b and 17b are controlled by the ECU 2, so that the effective diameters PDRD and PDND of the two pulleys 12 and 14 are steplessly changed. A transmission gear ratio RATIO (=NDR/NDN), which is the ratio of a drive-pulley rotation speed NDR of the drive pulley 12 to a driven-pulley rotation speed NDN of the driven pulley 14, is thus steplessly controlled.

Figure 3:
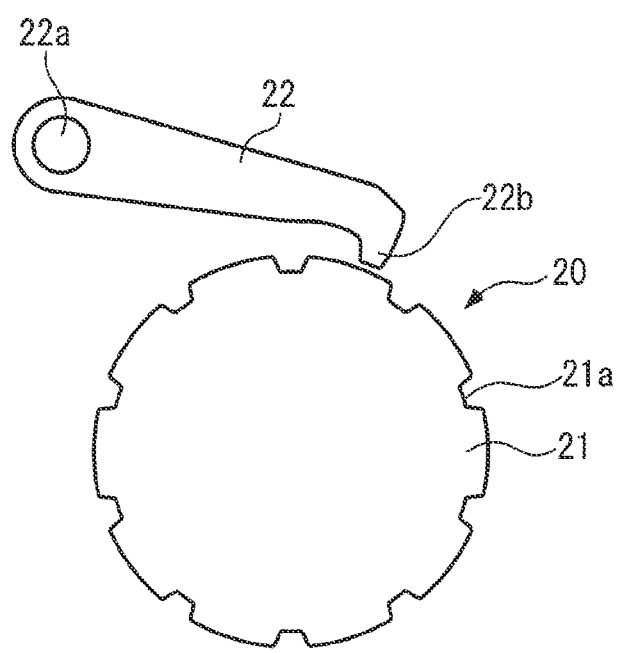
FIG. 3 is a diagram illustrating a parking mechanism.

The main shaft 11 of the continuously variable transmission 10 is provided with a parking mechanism 20. As illustrated in FIG. 3, the parking mechanism 20 includes a parking gear 21 and a parking pole 22. The parking gear 21 has a plurality of notches 21a equally spaced in the circumferential direction. The parking gear 21 is integral with the countershaft 13. The parking pole 22 is rotatably supported by a pivot 22a at one end thereof, and has a pawl 22b at the other end thereof.

When the shift lever is at a shift position outside the P range, the parking pole 22 is held at a distance from the parking gear 21. When the shift lever is placed in the P range, the parking pole 22 is driven to allow the pawl 22b to engage with one of the notches 21a of the parking gear 21, so that the countershaft 13 is locked.

The engine 3 is automatically stopped (for idling stop or idle reduction) when predetermined stop conditions are met, and is restarted when predetermined restart conditions are met. This is so-called idle reduction control executed by the ECU 2.

Figure 4:
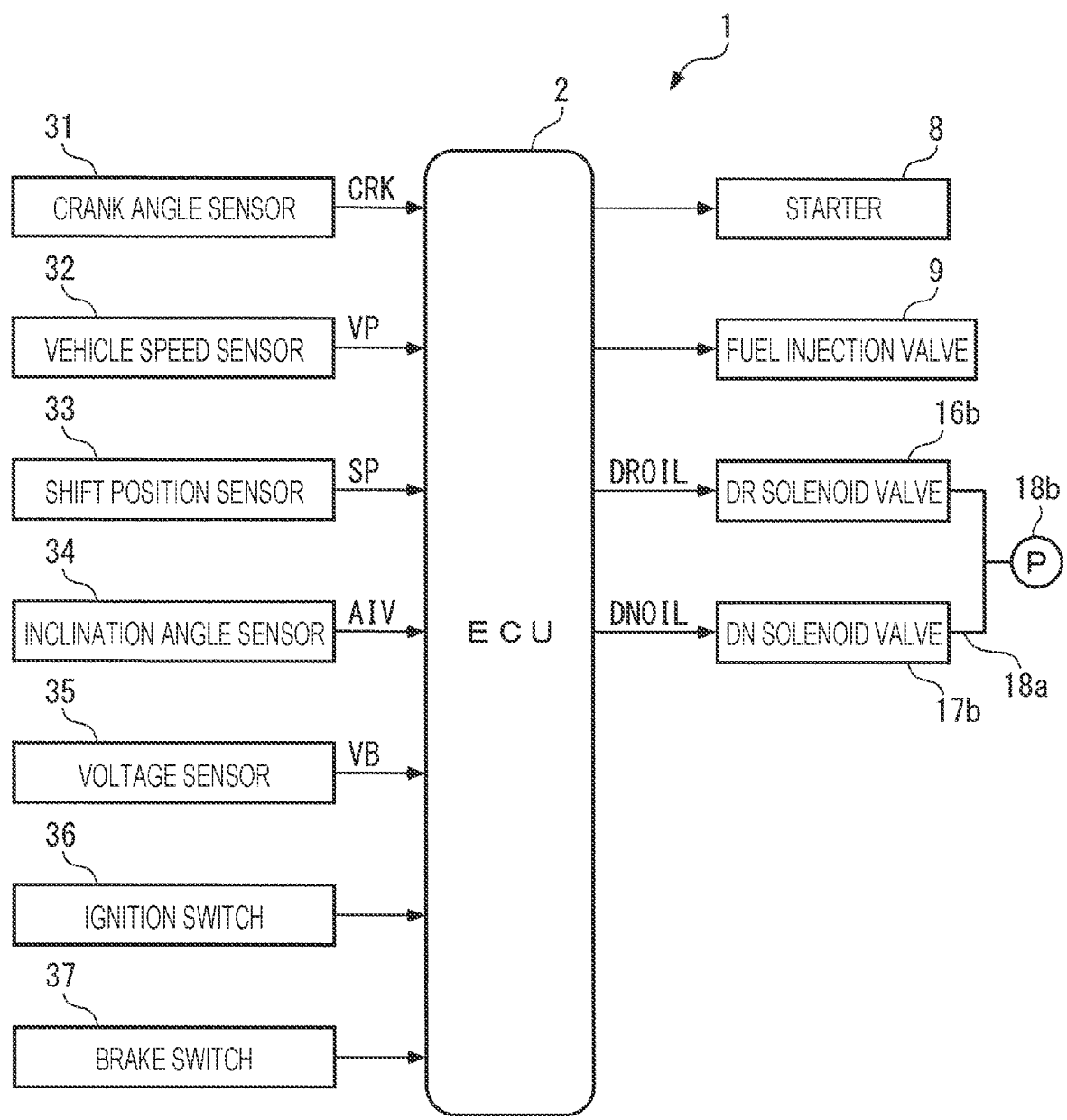
FIG. 4 is a block diagram illustrating the automatic stop/restart system.

The engine 3 is automatically stopped by stopping fuel injection from a fuel injection valve 9 (see FIG. 4). The engine 3 is restarted by driving a starter 8 with power from a battery 7 and rotating the crankshaft (or cranking) while injecting fuel from the fuel injection valve 9.

As illustrated in FIG. 4, the ECU 2 receives, from a crank angle sensor 31, a CRK signal representing the rotation speed of the crankshaft. On the basis of the CRK signal received, the ECU 2 calculates an engine rotation speed NE. Also, the ECU 2 receives, from a vehicle speed sensor 32, a detection signal representing a speed (vehicle speed) VP of the vehicle V.

The ECU 2 also receives from a shift position sensor 33 a detection signal representing a shift position SP of the shift lever, receives from an inclination angle sensor 34 a detection signal representing an inclination angle AIV of the vehicle V in the forward and backward direction, and receives from a voltage sensor 35 a detection signal representing the voltage of the battery 7 (hereinafter referred to as "battery voltage") VB. The ECU 2 calculates the remaining charge level of the battery 7 (hereinafter referred to as "remaining battery level") SOC on the basis of, for example, the battery voltage VB.

The ECU 2 also receives from an ignition switch 36 a detection signal representing the on/off state of the ignition switch 36, and receives from a brake switch 37 a detection signal representing the on/off state of a brake pedal (not shown) of the vehicle V.

The ECU 2 is constituted by a microcomputer including a central processing unit (CPU), a random-access memory (RAM), a read-only memory (ROM), and an input/output (I/O) interface (which are not shown). In accordance with the detection signals received from the various sensors 31 to 35 and switches 36 and 37 described above, the ECU 2 determines the operating states of the engine 3 and the vehicle V. On the basis of the operating states determined, the ECU 2 executes the idle reduction control for the engine 3 in accordance with, for example, a control program stored in the ROM. The ECU 2 constitutes a restart controller in the present embodiment.

Figure 5:
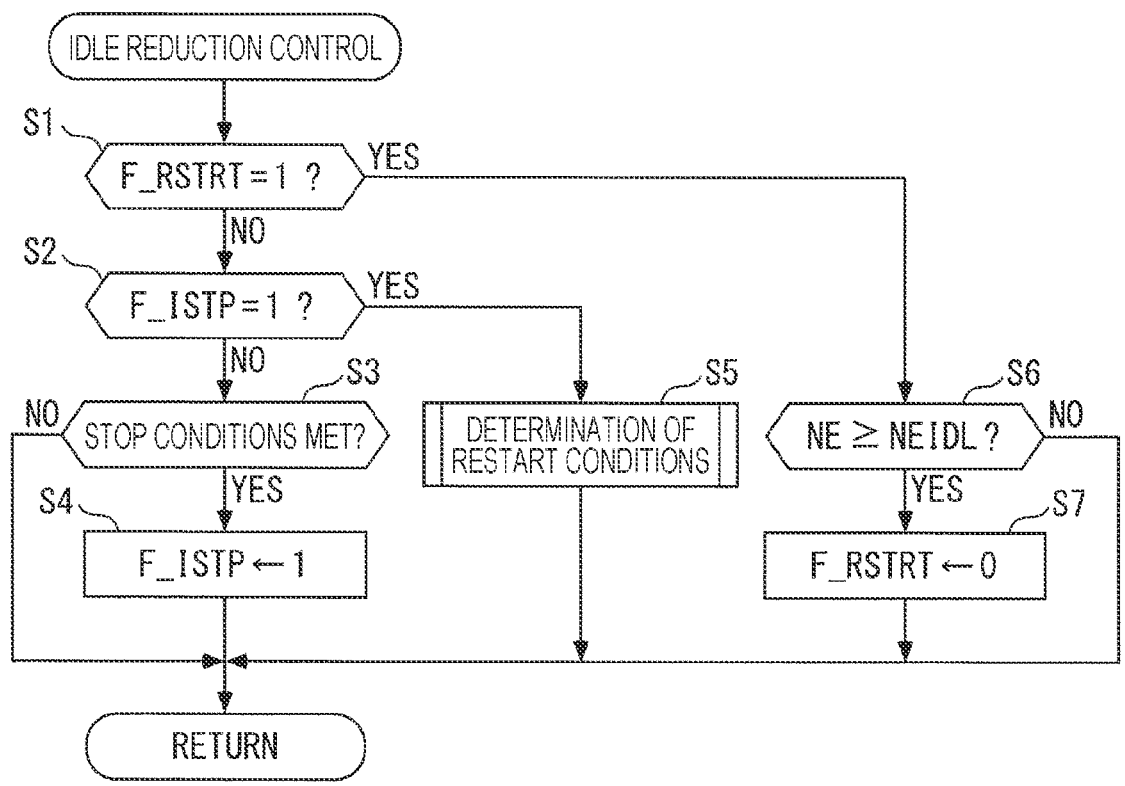
FIG. 5 is a flowchart illustrating a process of idle reduction control.

A process of idle reduction control executed by the ECU 2 will now be described with reference to FIG. 5. The process is repeatedly executed at predetermined intervals.

In step S1 and step S2 of the process, the ECU 2 first determines whether a restart flag F_RSTRT and an idle reduction flag F_ISTP are "1". If the answers to steps S1 and S2 are both NO, that is, if the engine 3 is neither during restart operation nor in idle reduction mode, then the ECU 2 determines in step S3 whether predetermined stop conditions for executing idle reduction are met.

Specifically, the ECU 2 determines whether the following conditions (a) to (e) are met:
(a) ignition switch 36 is on;
(b) vehicle speed VP is less than or equal to a predetermined idle-reduction starting vehicle speed VPISTP;
(c) shift position SP is in the D range (outside P, R, and N);
(d) brake switch 37 is on; and
(e) remaining battery level SOC is greater than or equal to a predetermined value SOCLMT.

If any of the conditions (a) to (e) is not met, the ECU 2 determines that the predetermined stop conditions are not met, and ends the process without executing the idle reduction. On the other hand, if all the conditions (a) to (e) are met, the ECU 2 determines that the predetermined stop conditions are met, and sets the idle reduction flag F_ISTP to "1" (step S4) to end the process. After the setting of F_ISTP=1, the supply of fuel to the engine 3 is stopped to start the idle reduction.

The idle-reduction starting vehicle speed VPISTP mentioned in the condition (b) defines the vehicle speed VP at which to start the idle reduction. For example, the idle-reduction starting vehicle speed VPISTP is a predetermined value greater than, but close to, the value "0".

After the idle reduction is started in response to the execution of step S4, the answer to step S2 becomes YES. In this case, the process proceeds to step S5, where the ECU 2 executes a process for determining whether restart conditions are met. The process illustrated in FIG. 5 ends here. In step S1, if the restart flag F_RSTRT is "1" (step S1 is yes), the process proceeds to step S6, where the ECU 2 determines whether an engine rotational speed NE is equal to or higher than a predetermined idling rotational speed NEIDL. If the engine rotational speed NE does not reach the predetermined idling rotational speed NEIDL (step S6 is "NO"), the engine is still in restart state, the process proceeds to RETURN. If the step S6 is "YES," the restart has been completed, the restart flag F_RSTRT is set to zero at the step S7 and the process of FIG. 5 ends.

FIG. 6 illustrates the process for determining whether restart conditions are met. In steps S11 to S17 of this process, the ECU 2 first determines the vehicle stop pattern of the vehicle V in idle reduction mode, in accordance with the shift position SP of the shift lever and the inclination angle AIV of the vehicle V.

Specifically, in step S11, the ECU 2 determines whether a vehicle-stop-pattern determination completion flag F_RDN is "1". If the answer to this is NO, that is, if the vehicle stop pattern has yet to be determined, then the ECU 2 determines whether the shift position SP is in the P range (step S12). If the answer to this is NO, that is, if the shift position SP remains in the D range as it was during transition to idle reduction mode, the ECU 2 determines that the vehicle stop pattern is a D-range pattern, and sets a D-range flag F_RD to "1" (step S13).

If the answer to step S12 is YES, that is, if the shift position SP has been changed from the D range to the P range, the ECU 2 determines whether the detected inclination angle AIV of the vehicle V is greater than or equal to a predetermined value AREF (e.g., 7%) (step S14). If the answer to this is YES, the ECU 2 determines that the vehicle stop pattern is a first P-range pattern where the shift position SP is in the P range and the inclination angle AIV is large. The ECU 2 then sets a first P-range flag F_RP1 to "1" (step S15).

On the other hand, if the answer to step S14 is NO, that is, if the inclination angle AIV is smaller than the predetermined value AREF, the ECU 2 determines that the vehicle stop pattern is a second P-range pattern where the shift position SP is in the P range and the inclination angle AIV is small. The ECU 2 then sets a second P-range flag F_RP2 to "1" (step S16). In step S17 following step S13, S15, or S16, the ECU 2 sets the vehicle-stop-pattern determination completion flag F_RDN to "1", and goes to step S18. After the execution of step S17, the answer to step S11 becomes YES. The process also proceeds to step S18 in this case.

In step S18, the ECU 2 determines whether the D-range flag F_RD is "1". If the answer to this is YES, that is, if the shift position SP in idle reduction mode is in the D range, the ECU 2 determines whether the brake switch 37 is off (step S19). If the answer to this is NO, that is, if the brake pedal is held down, the ECU 2 determines that the restart conditions are not met, and exits the process without starting the restart operation.

If the answer to step S19 is YES, that is, if the brake pedal is released (or transition to "brake released state" is complete), the ECU 2 determines that the restart conditions are met. The ECU 2 then resets the idle reduction flag F_ISTP to "0" (step S20) to terminate the idle reduction, sets the restart flag F_RSTRT to "1" (step S21) to start the restart operation, and exits the process.

If the answer to step S18 is NO, the ECU 2 goes to step S22, where it determines whether the first P-range flag F_RP1 is "1". If the answer to this is YES, that is, if the shift position SP in idle reduction mode is in the P range and the inclination angle AIV of the vehicle V is relatively large, the ECU 2 determines, as in step S19, whether the brake switch 37 is off (step S23). If the answer to this is NO, that is, if the brake pedal is held down, the ECU 2 determines that the restart conditions are not met, and exits the process without starting the restart operation.

On the other hand, if the answer to step S23 is YES, that is, if the brake pedal is released, the ECU 2 determines that the restart conditions are met. The ECU 2 executes step S20 and step S21 to terminate the idle reduction and start the restart operation. The ECU 2 then exits the process. As described above, if the vehicle stop pattern is the first P-range pattern where the inclination angle AIV of the vehicle V is relatively large, the engine 3 is restarted upon release of the brake pedal.

If the answer to step S22 is NO, that is, if the vehicle stop pattern is the second P-range pattern where the shift position SP in idle reduction mode is in the P range and the inclination angle AIV of the vehicle V is relatively small, the ECU 2 determines, as in steps S19 and S23, whether the brake switch 37 is off (step S24). If the answer to this is YES, that is, if the brake pedal is released, the ECU 2 determines that the restart conditions are not met, and exits the process without starting the restart operation.

If the answer to step S24 is NO, the ECU 2 determines whether the shift position SP is in the D range (step S25). If the answer to this is NO, the ECU 2 determines that the restart conditions are not met, and exits the process without starting the restart operation. On the other hand, if the answer to step S25 is YES, that is, if the brake pedal is held down (NO in step S24) and the shift position SP is switched from the P range to the D range (YES in step S25), the ECU 2 determines that the restart conditions are met. The ECU 2 then executes steps S20 and S21 to terminate the idle reduction and start the restart operation. The ECU 2 then exits the process.

As described above, in the case of the second P-range pattern where the inclination angle AIV of the vehicle V is relatively small, the restart of the engine 3 is put on hold even when the brake pedal is released. The engine 3 is restarted later on when the brake pedal is stepped on and the shift position SP is switched from the P range to the D range.

As described above, in the present embodiment, in the case of the first P-range pattern where, in idle reduction mode, the shift position SP of the shift lever is in the P range and the inclination angle AIV of the vehicle V is greater than or equal to the predetermined value AREF (steps S12, S14, and S15 in FIG. 6), the engine 3 is restarted upon release of the brake pedal (steps S23 and S21). This boosts the hydraulic pressure of the continuously variable transmission 10 dropped in idle reduction mode, and thus ensures sufficient supply of hydraulic pressure in advance.

Therefore, when the shift lever is moved from the P range to, for example, the D range to start the vehicle V later on, even if the resulting disengagement of the parking pole 22 of the parking mechanism 20 from the parking gear 21 causes abrupt transmission of significant load through the parking gear 21 to, for example, the driven pulley 14 of the continuously variable transmission 10, the groove width of the drive pulley 12 and the driven pulley 14 is maintained. This prevents the transmitting belt 15 from slipping off the pulleys 12 and 14, prevents the resulting damage to the pulleys 12 and 14 and the transmitting belt 15, and extends their lives.

On the other hand, in the case of the second P-range pattern where, in idle reduction mode, the shift position SP of the shift lever is in the P range and the inclination angle AIV of the vehicle V is smaller than the predetermined value AREF (steps S12, S14, and S16 in FIG. 6), the restart of the engine 3 is put on hold even if the brake pedal is released (YES in step S24). Thus, when the transmitting belt 15 is less likely to slip off because of the relatively small inclination angle AIV of the vehicle V, the restart of the engine 3 is put on hold and the idle reduction mode continues. Thus, as many advantages as possible of idle reduction, including improved fuel economy, are achievable.

The present disclosure is not limited to the embodiments described above, and can be implemented in various forms. For example, when the vehicle stop pattern is the second P-range pattern in the embodiments described above, the restart operation is started on condition that the brake pedal is stepped on again and the shift position SP is switched from the P range to the D range (NO in step S24, YES in step S25). Alternatively, the restart operation may be started only on condition that the brake pedal is stepped on.

Although the inclination angle detector is the inclination angle sensor 34 in the embodiments described above, a gravity (G) sensor or any of the following techniques may be used: a technique which involves estimation from variation in vehicle speed with respect to the torques of the internal combustion engine and the motor; another technique which involves estimation from the inclination of the fluid surface of the oil tank of the vehicle; and still another technique which involves estimation from a camera image.

The determination as to whether the brakes are turned off does not necessarily need to be made on the basis of the on/off state of the brake switch as in the embodiments described above. That is, the determination may be made on the basis of whether the braking force of the brakes is a predetermined value or below, whether the brake lamp is off (or the brake lamp switch is off), or whether the brake fluid pressure is a predetermined value or below, or may be made in accordance with the stroke of the brake pedal.

The criterion for determining whether the brakes are off may be changed in accordance with the inclination angle. For example, for a larger inclination angle, a larger value may be set as the predetermined value to be compared with the braking force in the determination. This means that when the inclination angle is large, the braking force is less likely to exceed the predetermined value. This makes it possible to determine at an earlier stage that the brakes have been turned off, advance the start of restart operation, and ensure sufficient supply of hydraulic pressure. Even when the predetermined value is set to a larger value in accordance with the inclination angle, if the brakes are applied hard with a braking force exceeding the predetermined value, the automatic stop state is maintained with no load applied to the parking mechanism.

The embodiments described above present a hydraulic belt-type continuously variable transmission as an example of the transmission. However, the transmission is not limited to this, and a transmission of any configuration can be adopted as long as it uses hydraulic pressure boosted by the internal combustion engine. The configuration of details of the automatic stop/restart system presented in the embodiments is merely an example, and may be changed as appropriate within the spirit of the present disclosure. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. An automatic stop/restart system for an internal combustion engine mounted in a vehicle, the automatic stop/restart system being configured to automatically stop the internal combustion engine when predetermined stop conditions are met and automatically restart the internal combustion engine when predetermined restart conditions are met, wherein the vehicle comprises: a hydraulic transmission and a parking mechanism, the hydraulic transmission being configured to change power from the internal combustion engine using hydraulic pressure boosted by rotational driving force of the internal combustion engine, the parking mechanism including a locking member and configured to hold the vehicle stationary by locking, with the locking member, the rotation of a power transmitting member when a shift position of a shift operation member of the transmission is in a parking range, the power transmitting member being configured to transmit power between the internal combustion engine and driving wheels, the automatic stop/restart system comprising:
    a shift position detector configured to detect the shift position;
    an inclination angle detector configured to detect, in a forward-and-backward direction of the vehicle, an inclination angle of the vehicle with the vehicle being stationary;
    a brake operating state detector configured to detect an operating state of a brake of the vehicle; and
    a restart controller configured to perform control in such a manner that in a case when, in an automatic stop state of the internal combustion engine, the detected shift position of the shift operation member is in the parking range and the detected operating state of the brake is turn-off operation,
        the internal combustion engine is restarted when the detected inclination angle is greater than or equal to a predetermined value and
        the automatic stop state of the internal combustion engine is maintained when the detected inclination angle is smaller than the predetermined value.

2. The automatic stop/restart system according to claim 1, wherein the transmission is a hydraulic belt-type continuously variable transmission that comprises:
    a drive pulley and a driven pulley mounted on an input shaft and an output shaft, respectively, and configured to steplessly set a transmission gear ratio in accordance with a groove width varied by the hydraulic pressure; and
    an endless belt wound around the drive pulley and the driven pulley.

3. The automatic stop/restart system according to claim 1, wherein the brake operating state detector determines, when a braking force of the vehicle exerted by the brake is less than or equal to a predetermined braking value, that the turn-off operation is performed, and the predetermined braking value is set to a larger value for a larger inclination angle.

4. The automatic stop/restart system according to claim 1, wherein the brake operating state detector determines the turn-off operation based on one of on-and-off state of a brake switch, whether a brake lamp is off, whether a brake lamp switch is off, whether brake fluid pressure is a predetermined value or below, or a stroke amount of a brake pedal.

5. A control method of an automatic stop/restart system for an internal combustion engine mounted in a vehicle, the automatic stop/restart system being configured to automatically stop the internal combustion engine when predetermined stop conditions are met and automatically restart the internal combustion engine when predetermined restart conditions are met, wherein the vehicle comprises: a hydraulic transmission and a parking mechanism, the hydraulic transmission being configured to change power from the internal combustion engine using hydraulic pressure boosted by rotational driving force of the internal combustion engine, the parking mechanism including a locking member and configured to hold the vehicle stationary by locking, with the locking member, the rotation of a power transmitting member when a shift position of a shift operation member of the transmission is in a parking range, the power transmitting member being configured to transmit power between the internal combustion engine and driving wheels, the method comprising steps of:
    detecting by a computer the shift position;
    detecting by a computer, in a forward-and-backward direction of the vehicle, an inclination angle of the vehicle with the vehicle being stationary;
    detecting by a computer an operating state of a brake of the vehicle; and
    performing control by a computer in such a manner that in a case when, in an automatic stop state of the internal combustion engine, the detected shift position of the shift operation member is in the parking range and the detected operating state of the brake is turn-off operation,
        the internal combustion engine is restarted when the detected inclination angle is greater than or equal to a predetermined value and
        the automatic stop state of the internal combustion engine is maintained when the detected inclination angle is smaller than the predetermined value.

* * * * *